United States Patent
Maxwell et al.

(10) Patent No.: US 9,350,180 B2
(45) Date of Patent: May 24, 2016

(54) LOAD SWITCH HAVING LOAD DETECTION

(75) Inventors: Christopher T. Maxwell, Sherman, TX (US); John M. Perry, McKinney, TX (US); Aline C. Sadate, Allen, TX (US); James C. Spurlin, Sherman, TX (US); Nakshatra S. Gajbhiye, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1366 days.

(21) Appl. No.: 13/096,839

(22) Filed: Apr. 28, 2011

(65) Prior Publication Data

US 2012/0274153 A1    Nov. 1, 2012

(51) Int. Cl.
*H02J 1/00* (2006.01)
*H02J 7/00* (2006.01)
*H02M 1/00* (2006.01)

(52) U.S. Cl.
CPC ...... *H02J 7/0036* (2013.01); *H02M 2001/0032* (2013.01); *Y02B 70/16* (2013.01); *Y10T 307/832* (2015.04)

(58) Field of Classification Search
None
See application file for complete search history.

(56) References Cited

U.S. PATENT DOCUMENTS

| | | | |
|---|---|---|---|
| 5,818,707 A * | 10/1998 | Seong et al. | 363/89 |
| 6,812,715 B2 | 11/2004 | Chiozzi et al. | |
| 7,859,132 B2 | 12/2010 | Chung et al. | |
| 2007/0046143 A1* | 3/2007 | Blandino et al. | 310/317 |
| 2010/0090755 A1 | 4/2010 | Ng et al. | |
| 2012/0049825 A1* | 3/2012 | Chen et al. | 323/284 |

* cited by examiner

*Primary Examiner* — Jared Fureman
*Assistant Examiner* — Aqeel Bukhari
(74) *Attorney, Agent, or Firm* — Lawrence J. Bassuk; Frank D. Cimino

(57) ABSTRACT

Conventionally, current detection in load switches is implemented by monitoring the voltage across a small value sense resistor in series with the load switch, where the differential voltage across is applied to a comparator to generate a control signal corresponding to a light load condition, a normal load condition, or an over-load condition. Detecting the light load condition, however, can be difficult to determine using this arrangement due to the low differential voltage. Here, however, a integrated circuit (IC) is provided that employs an internal voltage supply and comparators to examine the load current to determine whether a light load condition is present, which does not suffer from the same problems.

16 Claims, 3 Drawing Sheets

LOAD SWITCH HAVING LOAD DETECTION

TECHNICAL FIELD

The invention relates generally to a load switch and, more particularly, to a load switching having a load detection capability.

BACKGROUND

Battery charging systems for cell phones and other portable electronics have become commonplace. In normal operation, a charger supplies current to a device (i.e., cell phone) to charge its battery. As the cell phone battery nears full charge, the load current or current draw by the device reduces, so it is advantageous to shut off the charger to reducing energy usage. Additionally, it is advantageous to shut off the charger when device is unplugged from the charger so as to allow the charger to remain in a very low power state while plugged into a wall receptacle, greatly reducing standby power consumption, commonly referred to as "vampire" power.

Turning to FIG. 1, an example of a conventional integrated circuit (IC) 100 having a load switch 106 can be seen. This load switch 106 is generally used to switch and control power from a power supply 108 (i.e., charger) to load 110 (i.e., battery). Load switch 106 generally comprises transistors Q1 and Q2 (which can, for example be NMOS transistors, as shown or PMOS transistors) that are arranged in a back-to-back configuration to perform reverse current blocking by the body diode connections. The IC 100 also generally includes a comparator 102 and control logic 104 to control the operation of the load switch 106. In operation, the power supply 108 is coupled to the input pin VIN so as to power circuitry internal to the IC 100 (i.e., comparator 102 and control logic 104) in conjunction with the ground pin GND and provides power to the load switch 106 through the sense resistor RSEN and sense pin SENSE. The input terminals of the comparator 102 are coupled to the input pin VIN and sense pin SENSE so as to sense the current traversing the load switch 106 to the output pin OUT and load 110, when active. Typically, this sense resistor RSEN has a low resistance (i.e., about 10 mΩ to about 20 mΩ) so as to maintain a low power loss through the resistor RSEN. As a result of monitoring the differential voltage across the sense resistor RSEN, the comparator 102 is able to generate control signals that correspond to a light load condition, a normal load condition, or an overload condition. Based at least in part on the control signals from comparator 102, the control logic 104 can control the load switch 106 (i.e., activate or deactivate).

There are some drawbacks to the IC 100; namely, detection of a light load condition can be problematic. Usually, for light load conditions, the differential voltage across the sense resistor RSEN can be between 0-10 mV, but, at this range, comparators (i.e., 102) are not generally very accurate. Therefore there is a need for improved controls for a load switch.

Some other conventional circuits are: U.S. Pat. No. 6,812,715; U.S. Pat. No. 7,859,132; and U.S. Patent Pre-Grant Publ. No. 2010/0090755.

SUMMARY

An embodiment of the present invention, accordingly, provides an apparatus. The apparatus comprises an input terminal that is configured to be coupled to a power supply; an output terminal that is adapted to be coupled to a load; a load switch that is coupled between the input terminal and the output terminal; a voltage supply that is coupled to the input terminal and the output terminal so as to provide a boost current to the output terminal; a comparison circuit that is coupled to the output terminal, wherein the comparison circuit indicates a light load condition during a test state; and control logic that is coupled the load switch and to the comparison circuit, wherein the control logic is configured to activate the load switch, and wherein the control logic is configured to deactivate the load switch at a first rate and a second rate, and wherein the first rate is greater than the second rate, and wherein the control logic is configured to deactivate the load switch at the second rate during the test state.

In accordance with an embodiment of the present invention, the comparison circuit further comprises: a first comparator that is coupled to the output terminal and the control logic and that receives a first reference voltage; and a second comparator that is coupled to the output terminal and the control logic and that receives a second reference voltage.

In accordance with an embodiment of the present invention, the input and the output terminals further comprise input and output pins, respectively.

In accordance with an embodiment of the present invention, the voltage supply further comprises: a boost converter that is coupled to the input pin; and a resistor that is coupled between the boost converter and the output pin.

In accordance with an embodiment of the present invention, the apparatus further comprises a inductor pin, and wherein the boost converter further comprises: an inductor that is coupled between the inductor pin and the input pin; and a boost controller that is coupled to the inductor pin and the resistor.

In accordance with an embodiment of the present invention, the load switch further comprises an NMOS transistor.

In accordance with an embodiment of the present invention, the apparatus further comprises a third comparator that coupled to the gate and drain of the NMOS transistor and the control logic, wherein the third comparator determines whether the gate-drain voltage of the NMOS transistor is zero or less.

In accordance with an embodiment of the present invention, a method is provided. The method comprises activating a load switch so as to provide power to an output terminal; providing a boost current to the output terminal; deactivating the load switch at a predetermined rate; comparing an output voltage at the output terminal to a first threshold to determine whether a normal load condition is present; comparing the output voltage at the output terminal to a second threshold to determine whether a light load condition is present; and reactivating the load switch if the normal load condition is present.

In accordance with an embodiment of the present invention, the steps of deactivating, comparing the output voltage at the output terminal to the first threshold, comparing the output voltage at the output terminal to the second threshold are repeated at a predetermined interval.

In accordance with an embodiment of the present invention, the method further comprises deactivating a power supply that provides the power to the load switch if the light load condition is present.

In accordance with an embodiment of the present invention, the load switch further comprises an NMOS transistor, and wherein the method further comprises determining that the light load condition is present if the gate-drain voltage of the NMOS transistor is zero or less.

In accordance with an embodiment of the present invention, the load is a battery.

In accordance with an embodiment of the present invention, an apparatus is provided. The apparatus comprises a power supply; a load; an integrated circuit (IC) having: an input pin that is coupled to the power supply; an output pin that is adapted to be coupled to the load; a load switch that is coupled between the input pin and the output pin; a voltage supply that is coupled to the input pin and the output pin so as to provide a boost current to the output pin; a comparison circuit that is coupled to the output pin, wherein the comparison circuit indicates a light load condition during a test state; and control logic that is coupled the load switch and to the comparison circuit, wherein the control logic is configured to activate the load switch, and wherein the control logic is configured to deactivate the load switch at a first rate and a second rate, and wherein the first rate is greater than the second rate, and wherein the control logic is configured to deactivate the load switch at the second rate during the test state.

In accordance with an embodiment of the present invention, the load switch further comprises an NMOS transistor, and wherein the apparatus further comprises a third comparator that coupled to the gate and drain of the NMOS transistor and the control logic, wherein the third comparator determines whether the gate-drain voltage of the NMOS transistor is zero or less.

In accordance with an embodiment of the present invention, the load further comprise a battery, and wherein the power supply further comprises a charger.

In accordance with an embodiment of the present invention, the load switch further comprises an PMOS transistor, and wherein the apparatus further comprises a third comparator that coupled to the gate and source of the PMOS transistor and the control logic, wherein the third comparator determines whether the gate-source voltage of the PMOS transistor is zero or less.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
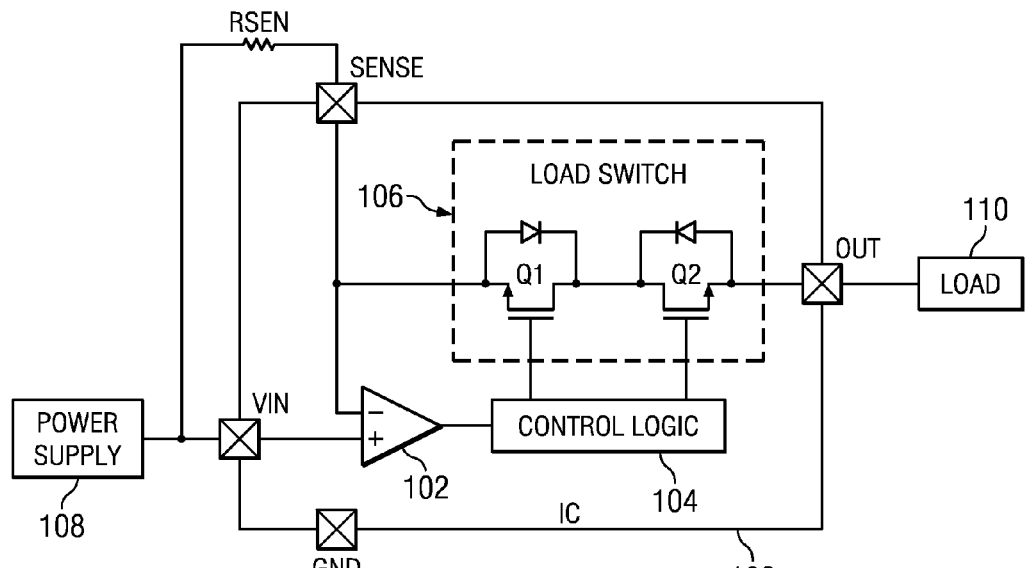
FIG. 1 is an example of a conventional IC having a load switch.

Refer now to the drawings wherein depicted elements are, for the sake of clarity, not necessarily shown to scale and wherein like or similar elements are designated by the same reference numeral through the several views.

Figure 2A:
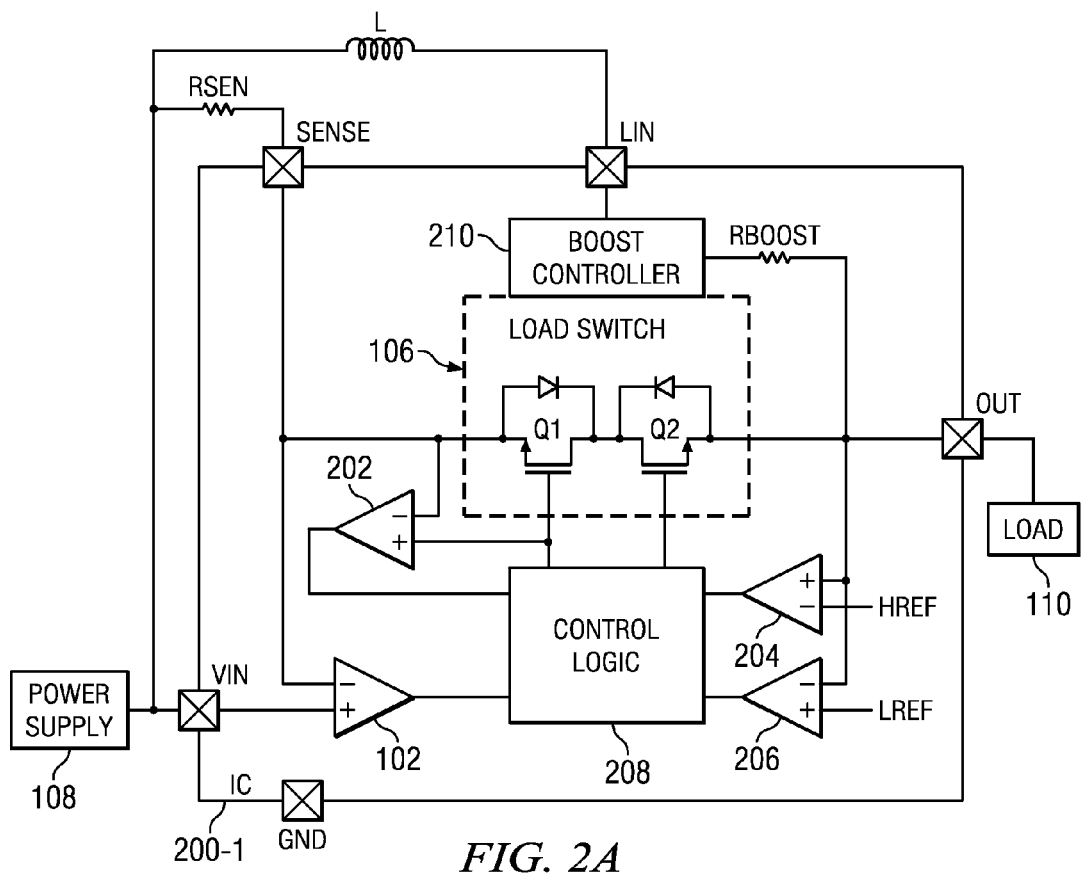
FIGS. 2A and 2B are an examples of ICs in accordance with an embodiment of the present invention.
Figure 2B:
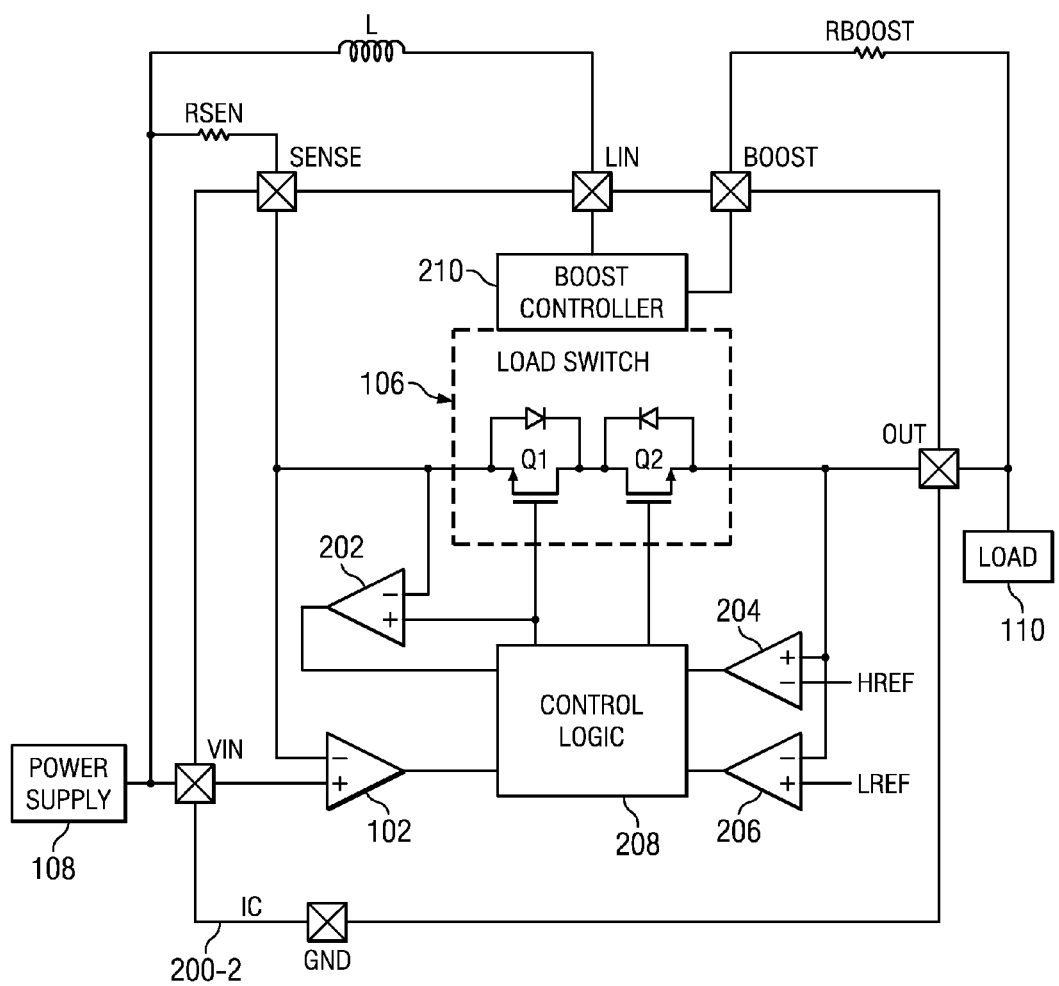

Turning to FIGS. 2A and 2B, examples of an ICs 200-1 and 200-2 having a load switch 106 in accordance with an embodiment of the invention can be seen. As shown, ICs 200-1 and 200-2 uses many of the same components as IC 100, namely, comparator 102 and sense resistor RESN to determine an overload or over-current condition and load switch 106. However, in ICs 200-1 and 200-2, control logic 208 has replaced control logic 104, and IC 200-1 and 200-2 each include comparators 202, 204, and 206, and a voltage supply (which is typically a boost converter having inductor L and boost controller 210 that are each coupled to the inductor pin LIN). Additionally, IC 200-1 includes resistor RBOOST "on chip," while IC 200-2 includes a boost pin BOOST that allows resistor RBOOST to provided "off chip."

Figure 3:
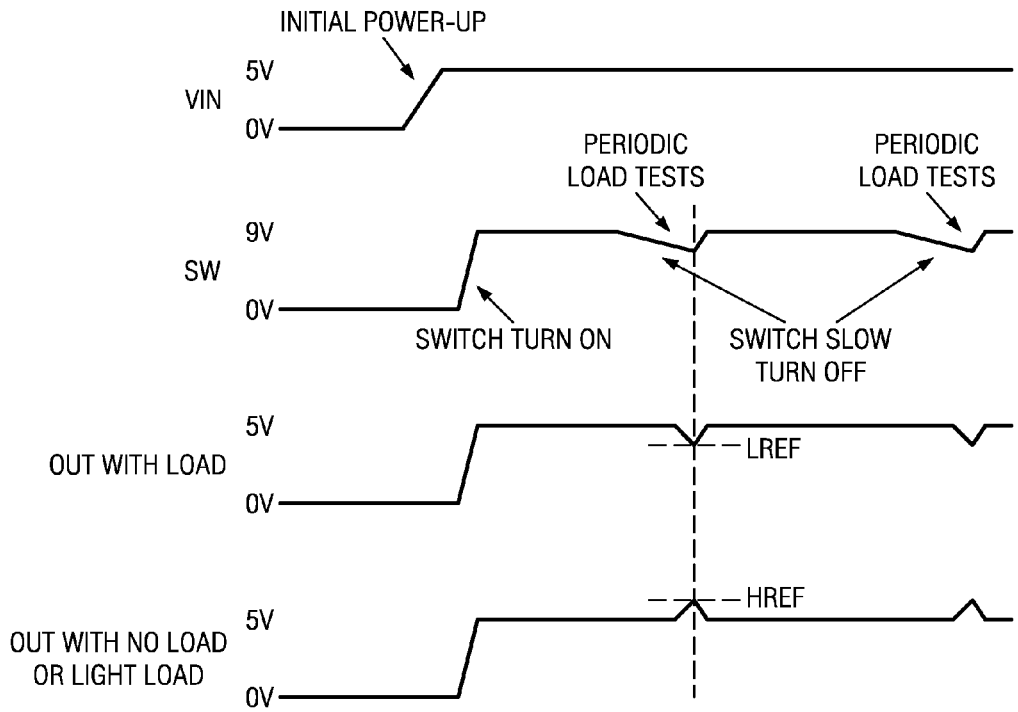
FIGS. 3 and 4 are diagrams illustrating the functionality of the IC of FIG. 2.

In operation, the voltage supply (i.e., boost converter 210 and inductor L) and comparators 204 and 206 are used to determine a light load condition, as shown in FIG. 3. Typically, after power-up (when pin VIN reaches, for example, 5V), the control logic 208 activates the load switch 106 with control signal SW, and the voltage supply provides a voltage to the output pin OUT (i.e., about 5.25V) that is greater than the voltage at the input pin VIN (i.e., about 5V). A predetermined intervals (i.e., periodic at a frequency of about 5 s), the control logic 208 enters a test state and begins to "turn off" the load switch. Typically, the control logic 208 is able to activate and deactivate the load switch 106 at a number of predetermined rates, and the "turn off" rate for the test state is typically lower than the other predetermined rates, called a "slow turn off" that may be about 10 V/s to about 20 V/s. As this is occurring, the voltages at the input pin VIN and output pin OUT become decoupled so as to allow the boost current (provided from the voltage supply and limited by resistor RBOOST) to exert more influence on the voltage at the output pin OUT. If the boost current is perfectly matched to the load current, the voltage at the output pin OUT would remain constant, but if not, then the voltage on the output pin OUT would change. When the boost current is less than the load current, the voltage at the output pin OUT begins to decrease, and, once the voltage at the output pin OUT falls below the low threshold or reference voltage LREF (i.e., about 4.95V), comparator 206 indicates that a normal load condition is present so that the control logic 208 can reassert or reactivate the load switch 106. When the boost current is greater than the load current, the voltage at the output pin OUT beings to increase, and, once the voltage at the output pin OUT reaches the high threshold or reference voltage HREF (i.e., about 5.15V), comparator 204 indicates a light load condition or a no-load condition. As a result of the light load or no-load condition, the control logic 208 can deactivate the load switch and/or the power supply 108 can be inactivated.

Figure 4:
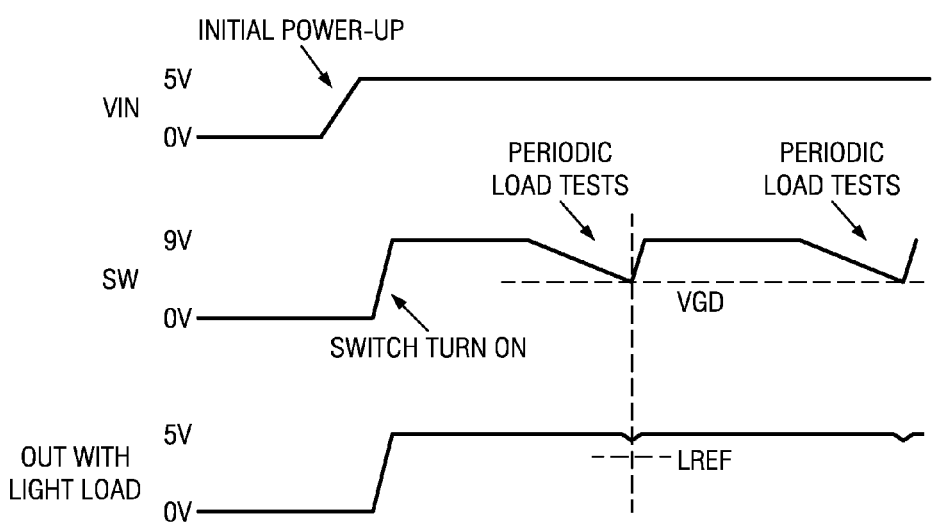

The use of comparators 204 and 206, however, may not be adequate under all circumstances. As stated above, if the boost current is perfectly matched to the load current, the voltage at the output pin OUT would remain constant, but if not, then the voltage on the output pin OUT would change. There may also be only a slight change (which is not detectable by comparators 204 and 206) when the boost current and load current are well-matched. For some applications, this type of reading may result in an indeterminate or ambiguous state. To address this situation, the input terminals of comparator 202 are coupled across the gate and drain (or source for a PMOS transistor) of one the transistors (i.e., Q1) of the load switch 106. Thus, when the gate-drain (or gate-source) voltage is zero or less (as shown in FIG. 4), the comparator 202 can indicate a light load condition, allowing the control logic 208 to reactivate the load switch 106.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an input terminal that is configured to be coupled to a power supply;
   an output terminal that is adapted to be coupled to a load;
   a load switch that is coupled between the input terminal and the output terminal;
   a voltage supply that is coupled to the input terminal and the output terminal so as to provide a boost current to the output terminal;
   wherein the voltage supply further comprises:
   a boost converter that is coupled to the input terminal; and
   a resistor that is coupled between the boost converter and the output terminal,
   a comparison circuit that is coupled to the output terminal, wherein the comparison circuit indicates a light load condition during a test state; and control logic that is coupled the load switch and to the comparison circuit,
   wherein the control logic is configured to activate the load switch, and wherein the control logic is configured to deactivate the load switch at a first rate and a second rate, and
   wherein the first rate is greater than the second rate, and
   wherein the control logic is configured to deactivate the load switch at the second rate during the test state,
   wherein the control logic is further configured to decouple voltages at the input terminal and output terminal so as to allow the boost current to exert influence on the voltage at the output terminal, and
   wherein the voltage supply provides a boost current, wherein the boost current is limited by the resistor.

2. The apparatus of claim 1, wherein the comparison circuit further comprises:
   a first comparator that is coupled to the output terminal and the control logic and that receives a first reference voltage; and
   a second comparator that is coupled to the output terminal and the control logic and that receives a second reference voltage.

3. The apparatus of claim 2, wherein the input and the output terminals are input and output pins, respectively.

4. The apparatus of claim 3 wherein the apparatus further comprises:
   a boost pin, and
   wherein the boost converter further comprises:
   an inductor that is coupled between an inductor pin and the input pin; and
   a boost controller that is coupled to the inductor pin and the resistor.

5. The apparatus of claim 4, wherein the load switch further comprises an NMOS transistor.

6. The apparatus of claim 5, wherein the apparatus further comprises
   a third comparator that coupled to the gate and drain of the NMOS transistor and the control logic,
   wherein the third comparator determines whether the gate-drain voltage of the NMOS transistor is zero or less.

7. An apparatus, comprising:
   means for activating a load switch so as to provide power to an output terminal;
   means for providing a boost current to the output terminal;
   means for deactivating the load switch at a predetermined rate;
   means for comparing an output voltage at the output terminal to a first threshold to determine whether a normal load condition is present;
   means for comparing the output voltage at the output terminal to a second threshold to determine whether a light load condition is present;
   a voltage supply that is coupled to an input terminal and the output terminal so as to provide a boost current to the output terminal;
   wherein the voltage supply further comprises:
   a boost converter that is coupled to the input pin; and
   a resistor that is coupled between the boost converter and the output terminal;
   means for reactivating the load switch if the normal load condition is present,
   wherein the means for deactivating, means for comparing the output voltage at the output terminal to the first threshold,
   means for comparing the output voltage at the output terminal to the second threshold repetition means that are repeated at a predetermined interval,
   wherein the means for activating the control switch further decouples voltages at the input terminal and output terminal so as to allow the boost current to exert influence on the voltage at the output terminal, and
   wherein the voltage supply provides a boost current, wherein the boost current is limited by the resistor.

8. The apparatus of claim 7, wherein the load switch further comprises:
   an NMOS transistor, and
   wherein the apparatus further comprises
   means for determining that the light load condition is present if the gate-drain voltage of the NMOS transistor is zero or less.

9. The apparatus of claim 8, wherein the load is a battery.

10. An apparatus comprising:
    a power supply;
    a load;
    an integrated circuit (IC) having:
    an input pin that is coupled to the power supply;
    an output pin that is adapted to be coupled to the load;
    a load switch that is coupled between the input pin and the output pin;
    a voltage supply that is coupled to the input pin and the output pin so as to provide a boost current to the output pin;
    wherein the voltage supply further comprises:
    a boost converter that is coupled to the input pin; and
    a resistor that is coupled between the boost converter and the output terminal,
    a comparison circuit that is coupled to the output pin,
    wherein the comparison circuit indicates a light load condition during a test state; and
    control logic that is coupled the load switch and to the comparison circuit,
    wherein the control logic is configured to activate the load switch, and
    wherein the control logic is configured to deactivate the load switch at a first rate and a second rate, and wherein the first rate is greater than the second rate, and
wherein the control logic is configured to deactivate the load switch at the second rate during the test state,
means for decoupling voltages at the input pin and output pin so as to allow the boost current to exert influence on the voltage at the output pin, and
means for providing boost current from the voltage supply, wherein the boost current is limited by the resistor.

11. The apparatus of claim 10, wherein the comparison circuit further comprises:
   a first comparator that is coupled to the output terminal and the control logic and that receives a first reference voltage; and
   a second comparator that is coupled to the output terminal and the control logic and that receives a second reference voltage.

12. The apparatus of claim 11, wherein the IC further comprises:
   a inductor pin, and
   wherein the boost converter further comprises:
   an inductor that is coupled between an inductor pin and the input pin; and
   a boost controller that is coupled to the inductor pin and the resistor.

13. The apparatus of claim 12, wherein the load switch further comprises
   an NMOS transistor, and
   wherein the apparatus further comprises
   a third comparator that coupled to the gate and drain of the NMOS transistor and the control logic,
   wherein the third comparator determines whether the gate-drain voltage of the NMOS transistor is zero or less.

14. The apparatus of claim 13, wherein the load further comprise
   a battery, and
   wherein the power supply further comprises a charger.

15. The apparatus of claim 12, wherein the load switch further comprises
   an PMOS transistor, and
   wherein the apparatus further comprises
   a third comparator that coupled to the gate and source of the PMOS transistor and the control logic,
   wherein the third comparator determines whether the gate-source voltage of the PMOS transistor is zero or less.

16. The apparatus of claim 15, wherein the load further comprise
   a battery, and
   wherein the power supply further comprises a charger.

* * * * *